United States Patent Office 3,248,265
Patented Apr. 26, 1966

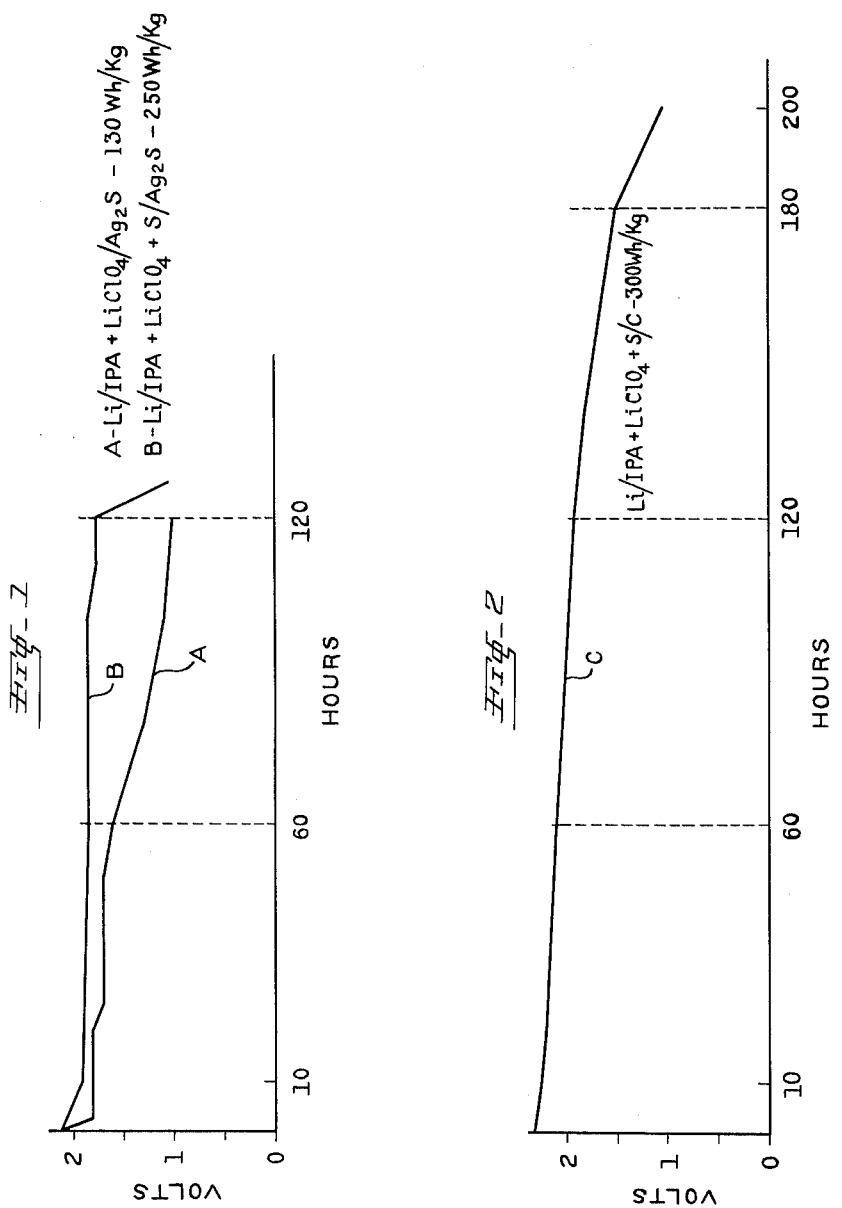

3,248,265
ELECTRIC CELL CONTAINING AMINE
ELECTROLYTE
Danuta Herbert, 44 Rue du Chemin Vert,
Boulogne-sur-Seine, France
Filed Aug. 18, 1961, Ser. No. 132,500
Claims priority, application France, Aug. 21, 1959,
803,326
10 Claims. (Cl. 136—6)

This application is a continuation-in-part of my application Serial No. 50,305, now abandoned, filed August 18, 1960 and entitled "Electric Dry Cells and Storage Batteries," which is related to my application with Julius Ulam, Serial No. 775,733, now Patent 3,043,896, filed November 24, 1958, and entitled "Electric Dry Cells and Storage Batteries."

This invention relates to electric cells, and, more particularly, to cells of both the non-rechargeable type and the rechargeable storage type.

Application Serial No. 775,733 is directed to an electric cell in which a preferred embodiment utilizes a negative electrode consisting of lithium and a positive electrode which may be a metallic sulphide. The cell has an electrolyte solution preferably consisting of a selected lithium salt dissolved in a propyl, butyl or amyl amine. Preferably isopropyl amine is utilized as the solvent. The disclosure of application Serial No. 775,733 is also in corresponding French Patent 1,189,268.

The present invention relates to an improvement in cells of the type described in copending application Serial No. 775,733 resulting in substantially higher efficiency, that is, watt hours output per kilogram of solution and resulting in a substantially flat discharge characteristic with very little initial voltage drop at the commencement of the discharge. The improved cells also have substantially reduced internal resistance. Moreover, the boiling point of the electrolyte solution is raised and the freezing point is lowered. The conservation of lithium in the electrolyte solution is improved, and the cells may utilize an inert or passive positive electrode, containing no oxidizing agent.

It is an object of the present invention, therefore, to provide a new and improved electric cell of high efficiency.

It is another object of the invention to provide a new and improved electric cell having a substantially flat discharge characteristic at a high voltage level over a long period of time.

It is another object of the invention to provide a new and improved electric cell having a low internal resistance.

In accordance with a preferred form of the present invention, an electric cell comprises an electrolyte solution comprising an electrolyte solvent comprising at least one amine selected from the group consisting of primary saturated aliphatic amines, secondary saturated aliphatic amines, and tertiary saturated aliphatic amines wherein the hydrocarbon chains attached to the nitrogen atom of the amines of said group are selected from the group consisting of propyl, butyl and amyl radicals, said electrolyte solution also comprising an electrolyte and at least one member of the group consisting of sulphur, selenium, tellurium, and compounds of at least two of these elements with one another; a negative electrode selected from the group consisting of lithium, amalgams of lithium and alloys of lithium; and a positive electrode.

The previously mentioned improved characteristics of a cell constructed in accordance with the present invention as compared with cells of the type described in application Serial No. 775,733 result from the addition to the electrolyte solution of at least one member of the group consisting of sulphur, selenium, tellurium and compounds of at least two of these elements with one another.

Referring to the drawings:

FIG. 1 represents discharge characteristics to indicate the improvement obtained in a cell constructed in accordance with the invention having a lithium negative electrode and a silver sulphide positive electrode; and FIG. 2 represents a discharge characteristic obtained in a cell constructed in accordance with the invention having a lithium negative electrode and a carbon positive electrode.

Referring now more particularly to FIG. 1 of the drawings, curve A represents a discharge characteristic of a cell constructed in accordance with application Serial No. 775,733 having a lithium negative electrode, an electrolyte solution of isopropyl amine saturated with lithium perchlorate, and a silver sulphide positive electrode. The cell was discharged through a 200 ohm resistor from a value of approximately two volts to a value of approximately one volt in 120 hours. The cell had an energy output of 130 watt hour per kilogram of solution.

Curve B represents the discharge characteristic of a cell constructed in accordance with the present invention having a lithium negative electrode, an electrolyte solution of isopropyl amine saturated with lithium perchlorate and saturated with sulphur, and a silver sulphide positive electrode. As represented by curve B of FIG. 1, the discharge characteristic remained substantially flat at a level of approximately 2 volts across a 200 ohm resistor over a period of 120 hours. The cell had an energy output of 250 watt hours per kilogram of solution.

As a first preferred example, when the electrolyte solution was prepared at 180° C., the final product contained: 78% isopropyl amine, 4% lithium perchlorate, and 18% sulphur by weight. The electrolyte solution after the addition of lithium perchlorate was aged for twenty-four hours to allow the heat evolved to be dissipated, then the sulphur was added. The addition of sulphur was made in small quantities over a period of, for example, 8 to 10 days to allow the heat evolved to be dissipated to prevent a reaction of sulphur with the solvent. During the subsequent aging period of, for example, 4 to 6 weeks to allow polysulphides to form, the viscosity increased considerably and some jelly was formed which is believed to be due to a polymerization reaction of the sulphur resulting in the formation of polysulphides.

FIG. 2 represents the discharge characeristic of a cell constructed in accordance with the present invention utilizing an electrolyte solution of the above-described first example and having a lithium negative electrode, an electrolyte solution consisting of 78% isopropyl amine, 4% lithium perchlorate, saturated with 18% sulphur, and a sintered carbon positive electrode. The cell developed an output potential of approximately 2 volts across a 200 ohm resistor over a period of 120 hours and had an energy output of 300 watt hours per kilogram of solution. A cell of this type is reversible or rechargeable.

The internal resistance of cells constructed in accordance with the present invention is substantially lower than the internal resistance of cells constructed in accordance with application Serial No. 775,733. A cell having a lithium negative electrode, a silver sulphide positive electrode, and a solution of isopropyl amine saturated with lithium perchlorate n accordance with application Serial No. 775,733 was found to have an internal resistance of approximately 168 ohms. A cell constructed in accordance with the present invention having a lithium negative electrode, a silver sulphide positive electrode and a solution of isopropyl amine saturated with lithium perchlorate and saturated with sulphur in accordance with the above-described first example was found to have an internal resistance of approximately 27 ohms.

As a second preferred example, another electrolyte solution with excellent properties consists of: 77.2% isopropyl amine, 3.8% lithium perchlorate, 3.8% selenium, 15.2% sulphur by weight. The solution is maintained at 18° to 20° C. during the preparation. After the addition of the lithium perchlorate the solution is allowed to age 24 hours or more. At the end of that aging period, selenium is added in small quantities and the mixture is aged for 3 weeks more. Sulphur is then added in small quantities preferably to saturation, and after 3 additional weeks aging the electrolyte solution is ready for use, containing a mixture of selenium and sulphur. A cell constructed in accordance with the invention utilizing a lithium negative electrode, the above-described solution of the second example, and a sintered carbon positive electrode also has a relatively flat discharge characteristic and low internal resistance. As a third preferred example, the electrolyte solution can be prepared as described above in the first example but the isopropyl amine may be replaced by a mixture of 65% isopropyl amine and 35% butyl amine, with the percentages of lithium perchlorate and sulphur remaining as indicated in the first example. The lithium perchlorate is dissolved in this mixture and the solution containing the lithium perchlorate is aged for 24 hours. Then the sulphur is added in small quantities to avoid any temperature rise. The solution saturated with sulphur is then aged again to allow the formation of polysulphides which are recognizable by the change in color from yellow to green to red and the partial transmutation of the solution to a jelly which is believed to consist of polysulphides. A cell constructed in accordance with the invention utilizing a lithium negative electrode, the above-described electrolyte solution of the third example and a sintered carbon positive electrode has similar characteristics to the cells of the first and second examples.

The above-described electrolyte solutions are not corrosive to lithium, lithium alloys or amalgams substantially of lithium utilized as negative electrodes as described in application Serial No. 775,733. If a lithium alloy is utilized, the lithium alloy preferably is a lithium-sodium, lithium-zinc, lithium-silver or lithium-magnesium alloy having proportions of at least 95% lithium as described in application Serial No. 775,733. All the compounds recited in application Serial No. 775,733 are useful as positive electrodes, for example, chlorine, bromine, iodine, sulphur, selenium, oxides of sulphur, oxides of selenium, fluorides of sulphur, florides of selenium, metallic halogenides, metallic sulphides, metallic sulfocyanides, metallic nitrates, metallic chlorates, derivatives of metallic oxides.

Further, in cells constructed in accordance with the present invention, an inactive positive carbon electrode can be utilized and yields excellent results, as will be pointed out subsequently. The sulphur in soltuion is reduced at the carbon electrode which remains chemically inactive.

The electrolyte solution preferably consists of anhydrous isopropyl amine containing lithium perchlorate and saturated with sulphur. The percentage of lithium perchlorate and sulphur required depends on the temperature, but when the solution is maintained at a temperature of 18°–22° C., the solution yielded after the aging period is stable over a wide temperature range. Other propyl or butyl or amyl amines or mixtures thereof with one another may be substituted for the isopropyl amines. Since lithium reacts with water, the presence of water in the solution in long-life batteries is undesirable. However, in short-life non-rechargeable batteries operative for five minutes or less, minor amounts of water in the solution improve the conductivity.

Selenium or tellurium or two of these elements may be added in lieu of sulphur or in combination with sulphur, or compounds formed between these elements, for example, sulphur selenides may be added. The solution preferably is saturated with sulphur and preferably has a sulphur concentration above 8% by weight.

The lithium perchlorate may be replaced by a salt such as, for example, sodium perchlorate. Preferred salts which may be utilized are alkali chlorates, alkaline-earth chlorates, alkali perchlorates, alkaline-earth perchlorates, alkali thiocyanates, alkaline-earth thiocyanates, alkali rhodanides, alkaline-earth rhodanides, alkali iodides, alkaline-earth iodides, alkali bromides, alkaline-earth bromides, alkali chlorides, alkaline-earth chlorides or a mixture of these salts. Other salts having suitable characteristics may also be used.

The positive electrode may be carbon such as electric carbon, graphite, lamp black, acetylene black, active carbon or any other carbon type currently used in electric cells. The carbon electrode may be either a compact body or a compressed powder. If the positive electrode is a metal, such as, for example, copper, silver or nickel, the metal may be either a compact or a porous body. If the positive electrode is a mixture of carbon powder and metal powder, the electrode should be compressed. If the positive electrode is a metal sulphide, such as, for example, copper sulphide, silver sulphide, nickel sulphide, the electrode may be a compact body or a compressed mixture of powdered sulphide with carbon powder or may be prepared by electrochemical methods. If the positive electrode is an oxide or peroxide of a metal or a metal salt, such as, for example, a fluoride, chloride or bromide, the positive electrode may be mixed with a carbon powder or a metal powder and compressed.

The positive electrode may be an inert support, such as carbon or stainless steel, plated with an active metal or an active metal compound such as silver sulphide.

From the foregoing description, it will be apparent that cells constructed in accordance with the present invention develop substantially higher watt hours output per kilogram of solution, have substantially flat discharge characteristics with very little voltage drop at the commencement of the discharge and have substantially reduced internal resistance.

When used in the claims, the expression "at least one member of the group consisting of sulphur, selenium and tellurium" shall be construed to cover individual members of the recited group, physical mixtures thereof with one another and compounds of at least two of said members with one another.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

Having thus described my invention, what I claim and desire to protect by Letters Patent is:

1. In an electric cell comprising an electrolyte solution comprising an electrolyte solvent comprising at least one amine selected from the group consisting of primary saturated aliphatic amines, secondary saturated aliphatic amines and tertiary saturated aliphatic amines wherein the hydrocarbon chains attached to the nitrogen atom of the amines of said group are selected from the group consisting of propyl, butyl and amyl radicals; said electrolyte solution also comprising an electrolyte; a negative electrode selected from the group consisting of lithium, amalgams of lithium and alloys of lithium; and a positive electrode; the improvement which comprises the inclusion in said electrolyte of at least one member of the group consisting of sulphur, selenium and tellurium.

2. A cell in accordance with claim 1 in which said electrolyte solution is saturated with one member of said group consisting of sulphur, selenium, tellurium, and compounds of at least two of these elements with one another.

3. A cell in accordance with claim 1 in which said solution comprises a mixture of sulphur and selenium.

4. A cell in accordance with claim 1 in which said positive electrode is carbon.

5. A cell in accordance with claim 1 in which said negative electrode is lithium.

6. An electric cell as defined in claim 1 wherein said electrolyte solvent consists essentially of at least one amine selected from the group of amines consisting of propyl amines, butyl amines and amyl amines and mixtures of said amines with one another; and wherein said electrolyte is comprised of at least one salt selected from the group consisting of alkali chlorates, alkaline earth chlorates, alkali perchlorates, alkaline earth perchlorates, alkali thiocyanates, alkaline earth thiocyanates, alkali rhodanides, alkaline earth rhodanides, alkali iodides, alkaline earth iodides, alkali bromides, alkaline earth bromides, alkali chlorides and alkaline earth chlorides.

7. A cell in accordance with claim 6 in which said solvent is a mixture of isopropyl amine and butyl amine having a major portion by weight of isopropyl amine.

8. An electric cell as defined in claim 1 wherein said electrolyte solution is anhydrous and comprises a solvent consisting essentially of isopropyl amine; wherein said electrolyte is comprised of a salt selected from the group consisting of alkali chlorates, alkaline earth chlorates, alkali perchlorates, alkaline earth perchlorates, alkali thiocyanates, alkaline earth thiocyanates, alkali rhodanides, alkaline earth rhodanides, alkali iodides, alkaline earth iodides, alkali bromides, alkaline earth bromides, alkali chlorides and alkaline earth chlorides; and wherein said electrolyte solution is saturated with sulphur.

9. A cell as defined in claim 8 wherein said salt is lithium perchlorate.

10. A cell as defined in claim 1 wherein said electrolyte solution is anhydrous.

References Cited by the Examiner
UNITED STATES PATENTS

| | | | |
|---|---|---|---|
| 2,715,151 | 8/1955 | Gritman et al. | 136—27 |
| 2,921,110 | 1/1960 | Crowley | 136—86 |
| 2,930,830 | 3/1960 | Lieb | 136—153 |
| 2,937,219 | 5/1960 | Minnick et al. | 136—6 |
| 3,043,896 | 7/1962 | Herbert et al. | 136—6 |

FOREIGN PATENTS 1,242,385  8/1960  France.

OTHER REFERENCES

Jones: Inorganic Chemistry, 1947, page 509.
Mann: Transactions of the Electromechanical Society, vol. LXIX, 1936, pages 115–129.

WINSTON A. DOUGLAS, *Primary Examiner.*

JOHN R. SPECK, MURRAY A. TILLMAN,
*Examiners.*